US012170870B2

(12) United States Patent
Vercammen et al.

(10) Patent No.: US 12,170,870 B2
(45) Date of Patent: Dec. 17, 2024

(54) SYSTEMS AND METHODS FOR OPERATING A HEARING DEVICE IN ACCORDANCE WITH A PLURALITY OF OPERATING SERVICE TIERS

(71) Applicant: SONOVA AG, Staefa (CH)

(72) Inventors: Charlotte Vercammen, London (GB); Harald Krueger, Affoltern am Albis (CH); Stefan Launer, Zurich (CH)

(73) Assignee: Sonova AG, Staefa (CH)

( * ) Notice: Subject to any disclaimer, the term of this patent is extended or adjusted under 35 U.S.C. 154(b) by 241 days.

(21) Appl. No.: 17/894,796

(22) Filed: Aug. 24, 2022

(65) Prior Publication Data

US 2024/0073630 A1 Feb. 29, 2024

(51) Int. Cl.
*H04R 25/00* (2006.01)

(52) U.S. Cl.
CPC ......... *H04R 25/505* (2013.01); *H04R 25/558* (2013.01); *H04R 2225/41* (2013.01)

(58) Field of Classification Search
CPC .............. H04R 2225/41; H04R 25/505; H04R 25/558; H04R 2460/07; H04R 25/554
See application file for complete search history.

(56) References Cited

U.S. PATENT DOCUMENTS

| | | | |
|---|---|---|---|
| 6,658,307 B1 | 12/2003 | Mueller | |
| 9,648,430 B2 | 5/2017 | Dittberner et al. | |
| 2005/0226446 A1 | 10/2005 | Luo et al. | |
| 2010/0054510 A1* | 3/2010 | Schumaier ............. | H04R 25/75 381/314 |
| 2021/0092534 A1 | 3/2021 | Fichtl | |

* cited by examiner

*Primary Examiner* — Phylesha Dabney
(74) *Attorney, Agent, or Firm* — ALG Intellectual Property, LLC

(57) ABSTRACT

An exemplary hearing system includes a hearing device, a memory storing instructions and one or more processors communicatively coupled to the memory and configured to execute the instructions to perform a process comprising: accessing operating service tier data that associates a first operating service tier with a first set of hearing device functions and a second operating service tier with a second set of hearing device functions; detecting, while the hearing device operates in accordance with the first set of hearing device functions associated with the first operating service tier, a satisfaction of a condition associated with the second operating service tier; and directing, based on the detecting the satisfaction of the condition, the hearing device to switch from operating in accordance with the first set of hearing device functions to operating in accordance with the second set of hearing device functions.

17 Claims, 9 Drawing Sheets

SYSTEMS AND METHODS FOR OPERATING A HEARING DEVICE IN ACCORDANCE WITH A PLURALITY OF OPERATING SERVICE TIERS

BACKGROUND INFORMATION

Hearing devices (e.g., hearing aids) are used to improve the hearing capability and/or communication capability of users of the hearing devices. Such hearing devices are configured to process a received input sound signal (e.g., ambient sound) and provide the processed input sound signal to the user (e.g., by way of a receiver (e.g., a speaker) placed in the user's ear canal or at any other suitable location).

Hearing devices typically come in a variety of different configurations with different price points depending on the number and/or type of hearing device functions provided. For example, a hearing device may cost a first amount if the hearing device is configured to operate in accordance with a base set of hearing device functions, the hearing device may cost a second relatively larger amount if the hearing device is configured to operate in accordance with an advanced set of hearing device functions, and the hearing device may cost a third relatively larger amount if the hearing device is configured to operate in accordance with a premium set of hearing device functions. For economic and/or insurance coverage reasons, a user may decide to purchase a hearing device that is configured to operate in accordance with the base set of hearing device functions instead of the advanced set of hearing device functions or the premium set of hearing device functions. However, in so doing, the hearing device may not be configured to provide the user with the best possible hearing support and/or hearing device functions available at times when the user needs them the most.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION

Systems and methods for operating a hearing device in accordance with a plurality of operating service tiers are described herein. As will be described in more detail below, an exemplary system may access operating service tier data that associates a first operating service tier with a first set of hearing device functions and a second operating service tier with a second set of hearing device functions, the second set of hearing device functions including at least one hearing device function that is different than the hearing device functions included in the first set of hearing device functions; detect, while the hearing device operates in accordance with the first set of hearing device functions associated with the first operating service tier, a satisfaction of a condition associated with the second operating service tier; and direct, based on the detecting the satisfaction of the condition, the hearing device to switch from operating in accordance with the first set of hearing device functions to operating in accordance with the second set of hearing device functions.

By providing systems and methods such as those described herein, it may be possible to facilitate conditionally providing access to relatively more advanced and/or expensive hearing device functions (e.g., neural network-based noise cancellation, wind noise cancelling, etc.) even in instances where a user of a hearing device has paid for an operating service tier that does not include those hearing device functions. In so doing, systems and methods such as those described herein may provide a user of a hearing device with an improved hearing experience in a daily or exceptional situation during which it may be particularly needed or helpful to cope with, and/or increase the user's performance at a specific location (e.g., school, work, etc.). Additionally, systems and methods such as those described herein may facilitate a user-friendly upgrade of an operating service tier to a different operating service tier that includes relatively more hearing device functions, and/or provide the user with an incentive to upgrade an operating service tier of the hearing device. Other benefits of the systems and methods described herein will be made apparent herein.

Figure 1:
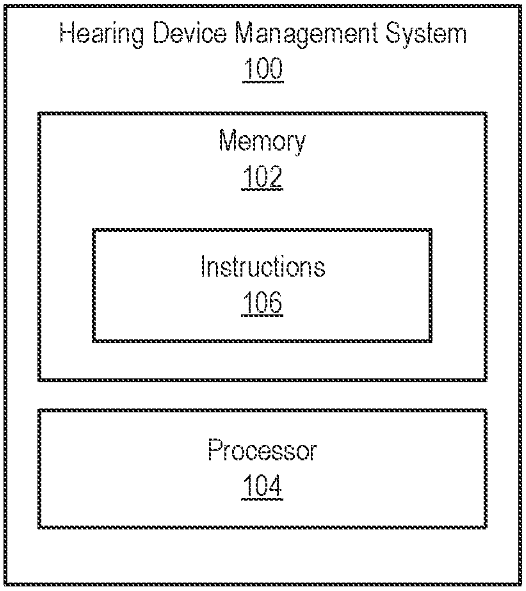
FIG. 1 illustrates an exemplary hearing device management system that may be implemented according to principles described herein.

FIG. 1 illustrates an exemplary hearing device management system 100 ("system 100") that may be implemented according to principles described herein. As shown, system 100 may include, without limitation, a memory 102 and a processor 104 selectively and communicatively coupled to one another. Memory 102 and processor 104 may each include or be implemented by hardware and/or software components (e.g., processors, memories, communication interfaces, instructions stored in memory for execution by the processors, etc.). In some examples, memory 102 and/or processor 104 may be implemented by any suitable computing device. In other examples, memory 102 and/or processor 104 may be distributed between multiple devices and/or multiple locations as may serve a particular implementation. Illustrative implementations of system 100 are described herein.

Memory 102 may maintain (e.g., store) executable data used by processor 104 to perform any of the operations described herein. For example, memory 102 may store instructions 106 that may be executed by processor 104 to perform any of the operations described herein. Instructions 106 may be implemented by any suitable application, software, code, and/or other executable data instance.

Memory 102 may also maintain any data received, generated, managed, used, and/or transmitted by processor 104. Memory 102 may store any other suitable data as may serve a particular implementation. For example, memory 102 may store operating service tier data, sets of hearing device functions, condition information (e.g., predetermined geographic area information, predetermined sound information, etc.), notification information, graphical user interface content, firmware data, and/or any other suitable data.

Processor 104 may be configured to perform (e.g., execute instructions 106 stored in memory 102 to perform) various processing operations associated with operating a hearing device in accordance with a plurality of operating service tiers. For example, processor 104 may perform one or more operations described herein to direct, based on a satisfaction of a condition, a hearing device to switch from operating in accordance with a first set of hearing device functions associated with a first operating service tier to operating in accordance with a second set of hearing device functions associated with a second operating service tier. These and other operations that may be performed by processor 104 are described herein.

As used herein, a "hearing device" may be implemented by any device or combination of devices configured to provide or enhance hearing to a user. For example, a hearing device may be implemented by a hearing aid configured to amplify audio content to a recipient, a sound processor included in a cochlear implant system configured to apply electrical stimulation representative of audio content to a recipient, a sound processor included in a stimulation system configured to apply electrical and acoustic stimulation to a recipient, or any other suitable hearing prosthesis. In some examples, a hearing device may be implemented by a behind-the-ear ("BTE") housing configured to be worn behind an ear of a user. In some examples, a hearing device may be implemented by an in-the-ear ("ITE") component configured to at least partially be inserted within an ear canal of a user. In some examples, a hearing device may include a combination of an ITE component, a BTE housing, and/or any other suitable component.

In certain examples, hearing devices such as those described herein may be implemented as part of a binaural hearing system. Such a binaural hearing system may include a first hearing device associated with a first ear of a user and a second hearing device associated with a second ear of a user. In such examples, the hearing devices may each be implemented by any type of hearing device configured to provide or enhance hearing to a user of a binaural hearing system. In some examples, the hearing devices in a binaural system may be of the same type. For example, the hearing devices may each be hearing aid devices. In certain alternative examples, the hearing devices may be of a different type. For example, a first hearing device may be a hearing aid and a second hearing device may be a sound processor included in a cochlear implant system.

Figure 2:
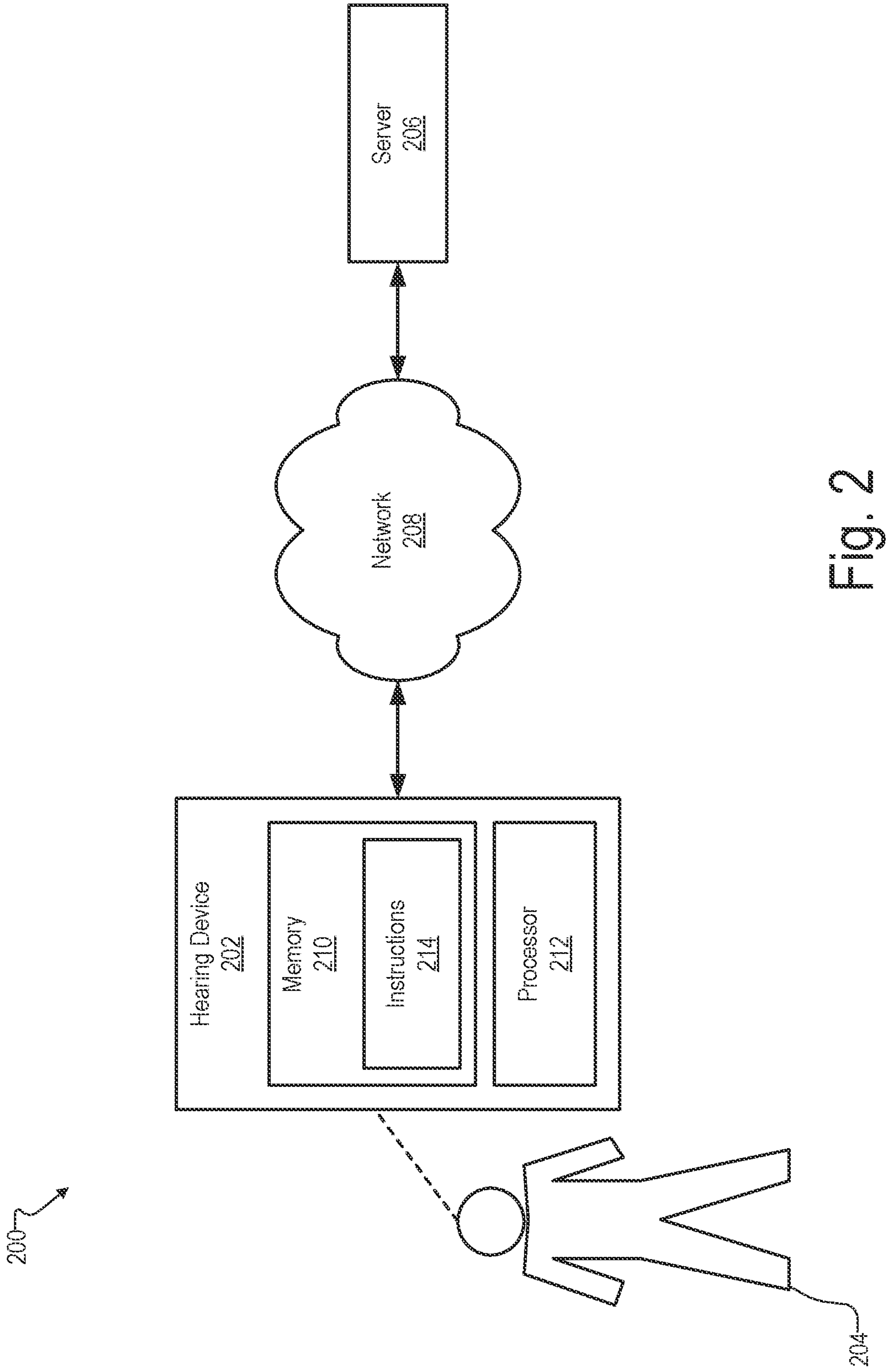
FIGS. 2-3 illustrate exemplary implementations of the hearing device management system of FIG. 1 according to principles described herein.
Figure 3:
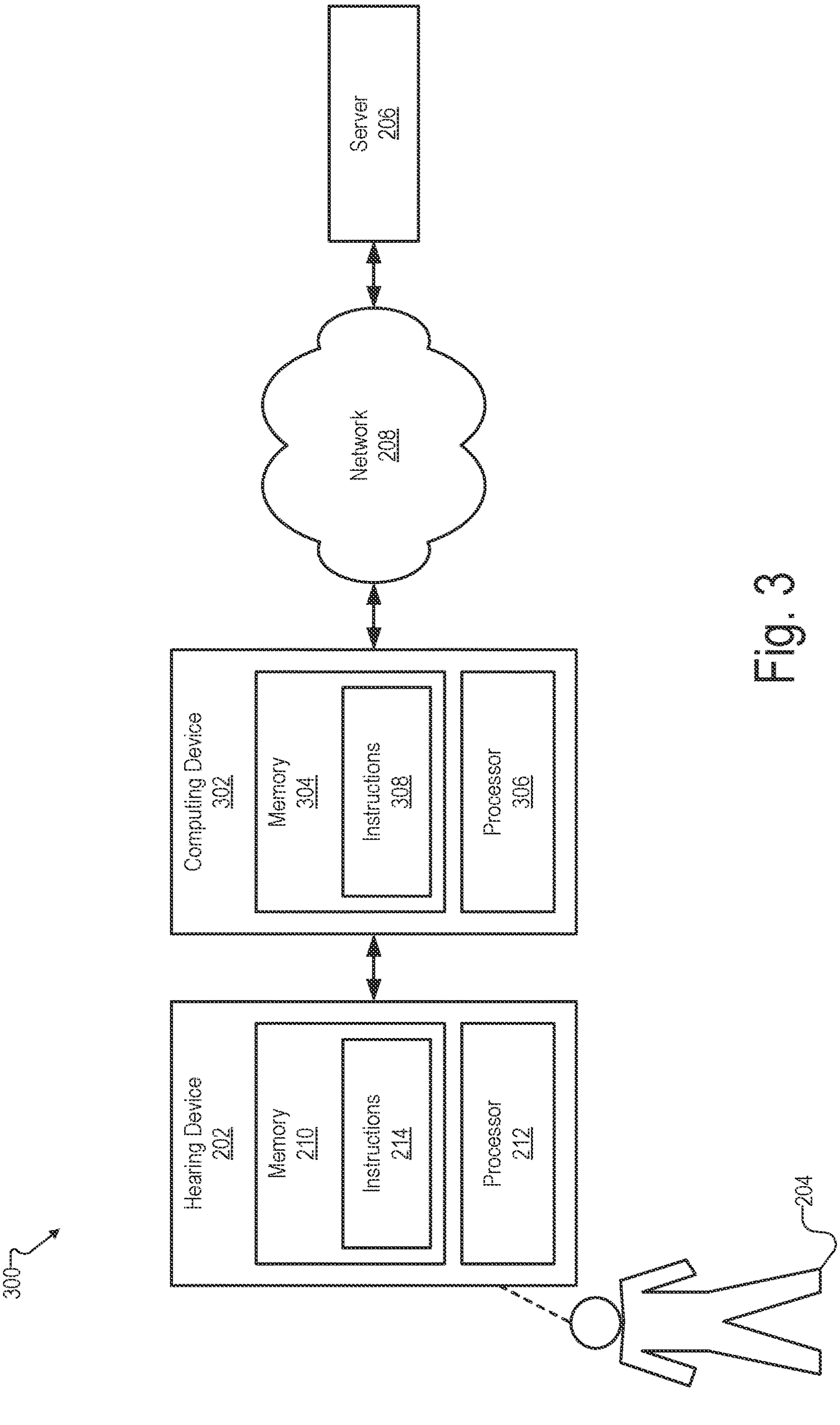

System 100 may be implemented in any suitable manner. For example, system 100 may be implemented as a hearing device, a communication device communicatively coupled to the hearing device, or a combination of the hearing device, the communication device, and/or any other suitable device. For example, FIG. 2 shows an exemplary implementation in which system 100 may be provided in certain implementations. As shown in FIG. 2, the implementation includes a hearing system 200 comprising a hearing device 202 that is associated with a user 204 and that is communicatively coupled to a server 206 by way of a network 208. FIG. 3 shows another exemplary implementation in which system 100 may be provided in certain implementations. As shown in FIG. 3, the implementation includes a hearing system 300 comprising hearing device 202 and a computing device 302 that is communicatively coupled to server 206 by way of network 208. Computing device 302 may include or be implemented by any suitable type of computing device or combination of computing devices as may serve a particular implementation. For instance, computing device 302 may be a portable device (e.g., a smartphone, smartwatch, tablet, and/or the like) communicatively coupled to hearing device 202 by way of a wireless communication channel (e.g., a Bluetooth connection).

Hearing device 202 may include, without limitation, a memory 210 and a processor 212 selectively and communicatively coupled to one another. Memory 210 and processor 212 may each include or be implemented by hardware and/or software components (e.g., processors, memories, communication interfaces, instructions stored in memory for execution by the processors, etc.). In some examples, memory 210 and processor 212 may be housed within or form part of a BTE housing. In some examples, memory 210 and processor 212 may be located separately from a BTE housing (e.g., in an ITE component). In some alternative examples, memory 210 and processor 212 may be distributed between multiple devices (e.g., multiple hearing devices in a binaural hearing system) and/or multiple locations as may serve a particular implementation.

Computing device 302 may include, without limitation, a memory 304 and a processor 306 selectively and communicatively coupled to one another. Memory 304 and processor 306 may each include or be implemented by hardware and/or software components (e.g., processors, memories, communication interfaces, instructions stored in memory for execution by the processors, etc.).

To illustrate, memory 102 and processor 104 of system 100 may be implemented by memory 210 and processor 212 of hearing device 202, or by memory 304 and processor 306 of computing device 302, or by memory 210, 304 and processors 212, 306 of hearing device 202 and computing device 302. For example, processors 212, 306 may be provided as a distributed processing system and/or in a master/slave configuration of processors 212, 306.

Memory 210, 304 may maintain (e.g., store) executable data used by processor 212, 306 to perform any of the operations associated with hearing device 202. For example, memory 210, 304 may store instructions 214, 308 that may be executed by processor 212, 306 to perform any of the operations associated with hearing device 202 assisting a user in hearing and/or any of the operations described herein. Instructions 214, 308 may be implemented by any suitable application, software, code, and/or other executable data instance.

Memory 210, 304 may also maintain any data received, generated, managed, used, and/or transmitted by processor 212, 306. For example, memory 210, 304 may maintain any suitable data associated with a hearing loss profile of a user, operating service tier data, and/or hearing device function data. Memory 210, 304 may maintain additional or alternative data in other implementations.

Figure 4:
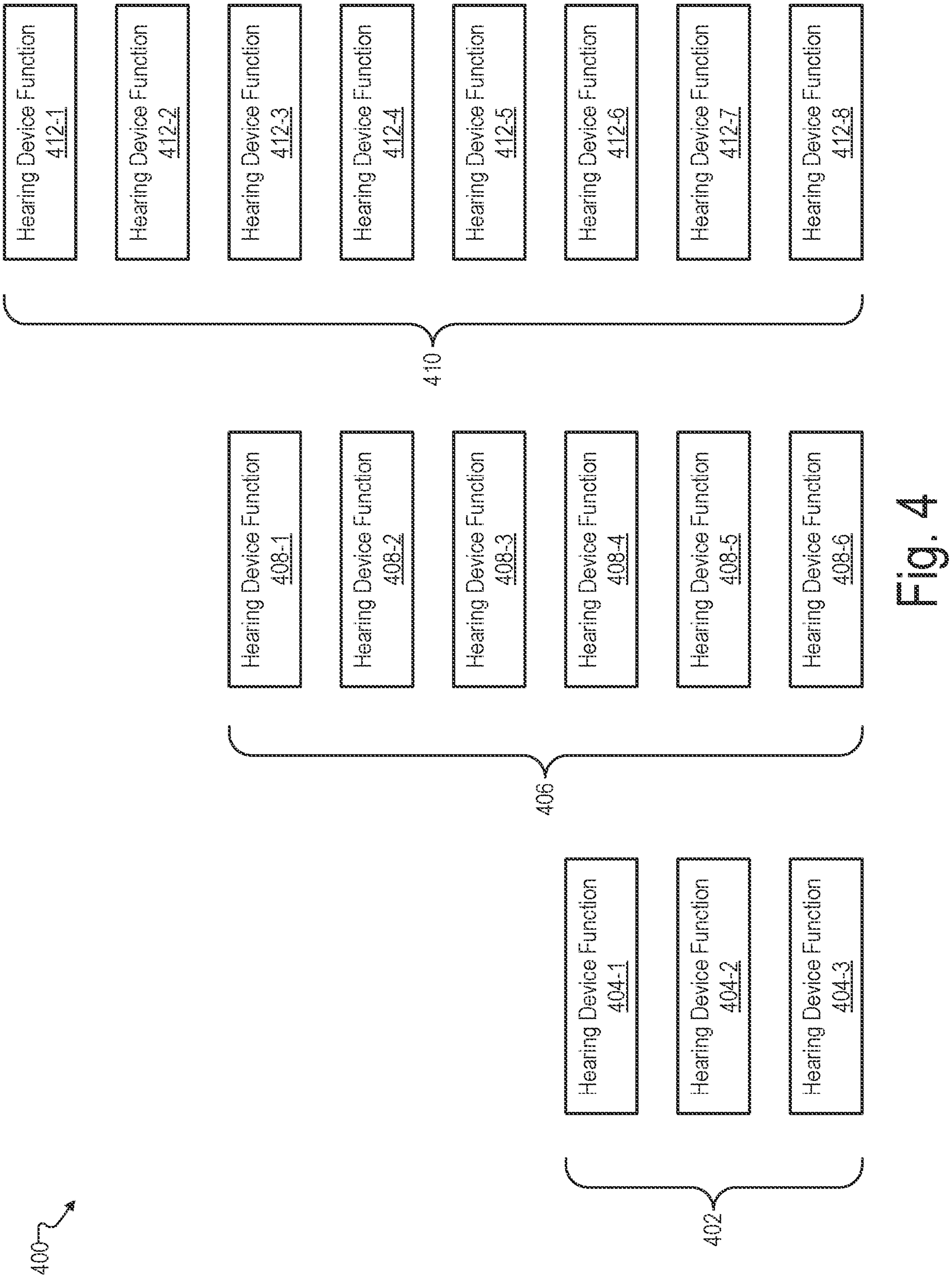
FIG. 4 illustrates an exemplary diagram of different operating service tiers that may be implemented according to principles described herein.

FIG. 4 shows an exemplary diagram 400 of operating service tier data that may be stored by memory 210 of hearing device 202 and/or by memory 304 of computing device 302. As shown in FIG. 4, memory 210, 304 may store a first operating service tier 402 that is associated with a first set of hearing device functions 404 (e.g., hearing device functions 404-1 through 404-3), a second operating service tier 406 that is associated with a second set of hearing device functions 408 (e.g., hearing device functions 408-1 through 408-6), and a third operating service tier 410 that is associated with a third set of hearing device functions (e.g., hearing device functions 412-1 through 412-8).

Each of first operating service tier 402, second operating service tier 406, and third operating service tier 410 may be associated with a different cost to user 204. For example, first operating service tier 402 may cost a first amount, second operating service tier 406 may cost a second amount that is relatively more than the first amount, and third operating service tier 410 may cost a third amount that is relatively more than the second amount. As such, third operating service tier 410 may be relatively more expensive than second operating service tier 406 and first operating service tier 402. In the example shown in FIG. 4, first operating service tier 402 may be relatively less expensive to purchase than the other operating service tiers shown in FIG. 4 because first operating service tier 402 is associated with relatively fewer hearing device functions than second operating service tier 406 and third operating service tier 410.

In the example shown in FIG. 4, set of hearing device functions 404 may be considered as a base level set of hearing device functions, set of hearing device functions 408 may be considered as an advanced level of hearing device functions, and set of hearing device functions 412 may be considered as a premium level of hearing device functions.

Hearing device functions 404, 408, and 412 may include any suitable type of hearing device function as may serve a particular implementation. For example, in set of hearing device functions 404, hearing device function 404-1 may correspond to a streaming speech function, hearing device function 404-2 may correspond to a streaming music function, hearing device function 404-3 may correspond to an available number of channels function, and hearing device function 404-4 may correspond to an active vent function. Set of hearing device functions 404 may include additional or alternative hearing device functions as may serve a particular implementation.

As shown in FIG. 4, second set of hearing device functions 408 includes relatively more hearing device functions than first set of hearing device functions 404. As such, second set of hearing device functions 408 may include at least one hearing device function that is different than hearing device functions included in first set of hearing device functions 404. Similarly, third set of hearing device functions 412 includes relatively more hearing device functions than first set of hearing device functions 404 and second set of hearing device functions 408. As such, third set of hearing device functions 412 may include at least one hearing device function that is different than the hearing device functions included in first set of hearing device functions 404 and second set of hearing device functions 408.

In certain examples, second set of hearing device functions 408 may include the same hearing device functions as those included in hearing device functions 404 but may include additional more advanced hearing device functions that are not included in first set of hearing device functions 404 of first operating service tier 402. Similarly, in certain examples, third set of hearing device functions 412 may include the same hearing device functions as those included in second set of hearing device functions 408 but may include additional relatively more advanced hearing device functions that are not included as part of first set of hearing device functions 404 and/or second set of hearing device functions 408. Exemplary more advanced hearing device functions that may be included as part of second set of hearing device functions 408 and/or third set of hearing device functions 412 may include, but are not limited to, neural network-based noise cancelling, wind noise cancelling, an In-Car program, special beamforming features (e.g., a binaural beamformer), special binaural solutions (e.g., Contralateral Routing of Signals ("CROS"), Bilateral Contralateral Routing of Signals ("BiCROS")), special user interaction options (e.g., a multiband equalizer), frequency compression, use of computing device 302 (e.g., a smartphone) as a remote microphone, self-learning features, additional Bluetooth connections (e.g., first operating service tier 402 may support only one Bluetooth connection or pairing at a time but second operating service tier 406 may support two or more Bluetooth connections or pairings at a time), voice assistant, canal microphone-based occlusion reduction, active noise cancelling, transcription, foreign language translation, fall detection, heart rate detection, heart rate variability detection, electrocardiogram ("ECG") recording, energy expenditure estimation, step count, breathing supervision, snoring detection, glucose level detection, oxygen saturation detection, synchronization of health outcomes, and/or any other suitable advanced hearing device function.

In certain examples, a hearing device function that may be included in first set of hearing device functions 404 may be replaced by a different hearing device function in second set of hearing device functions 408 and/or third set of hearing device functions 412. For example, first set of hearing device functions 404 may include a general "speech" program. However, second set of hearing device functions 408 may include a "speech in quiet" program and/or a "speech in noise" program instead of the general "speech" program.

Hearing device 202 may have all the hardware components (e.g., sensors, active vents, microphones, user interfaces, etc.) to be capable of operating in accordance with any of operating service tiers 402, 406, and 410. However, hearing device 202 may currently operate in accordance with one of them. For example, hearing device 202 may be configured to operate in accordance with first set of hearing device functions 404 associated with first operating service tier 402. All of the programing packages and/or firmware for operating hearing device 202 in accordance with hearing device functions associated with second operating service tier 406 and third operating service tier 410 may already be installed on hearing device 202 such that the associated advanced hearing device functions may be unlocked based on satisfaction of certain conditions such as those described herein. System 100 may perform such unlocking during use of hearing device 202 without requiring assistance from healthcare professional ("HCP") and/or without having to download and install additional software packages and/or firmware.

In certain examples, the hearing device functions associated with each of operating service tiers 402, 406, and 410 may be implemented by the same firmware installed in hearing device 202 (e.g., in memory 210) and/or installed in a computing device (e.g., computing device 302) communicatively coupled to hearing device 202. In certain alternative implementations, first set of hearing device functions 404 associated with first operating service tier 402 may be implemented by a first firmware installed in hearing device 202, second set of hearing device functions 408 associated with second operating service tier 406 may be implemented by a second firmware installed in hearing device 202, and third set of hearing device functions 412 associated with third operating service tier 410 may be implemented by a third firmware installed in hearing device 202. In such examples, the first, second, or third firmware may be activated depending on which of operating service tiers 402, 406, or 410 hearing device 202 is currently configured to operate in accordance with. Because the firmware used to implement the hearing device functions associated with each of operating service tiers 402, 406, and 410 may already be installed in hearing device 202, it is not necessary to update, replace, and/or download new firmware in hearing device 202 to facilitate switching between different operating service tiers such as those described herein.

The number of operating service tiers and the number of hearing device functions shown in FIG. 4 are provided for illustrative purposes only. It is understood that any suitable number of operating service tiers and/or hearing device functions may be used as may serve a particular implementation.

Returning to FIG. 2, processor 212 is configured to perform any suitable processing operation that may be associated with hearing device 202. For example, when hearing device 202 is implemented by a hearing aid device, such processing operations may include monitoring ambient sound and/or representing sound to user 204 via an in-ear receiver. Processor 212 may be implemented by any suitable combination of hardware and software.

Network 208 may include, but is not limited to, one or more wireless networks (Wi-Fi networks), wireless communication networks, mobile telephone networks (e.g., cellular telephone networks), mobile phone data networks, broadband networks, narrowband networks, the Internet, local area networks, wide area networks, and any other networks capable of carrying data and/or communications signals between hearing device 202 and server 206. In certain examples, network 208 may be implemented by a Bluetooth protocol and/or any other suitable communication protocol to facilitate communications between hearing device 202 and server 206. Communications between hearing device 202, server 206, and any other device/system may be transported using any one of the above-listed networks, or any combination or sub-combination of the above-listed networks.

When user 204 initially purchases hearing device 202, user 204 may select first operating service tier 402 for hearing device 202 to save money and/or for insurance reasons (e.g., the user's insurance company only covers the cost for first operating service tier 402). However, providing user 204 with hearing device 202 configured to operate in accordance with first operating service tier 402 may be regarded as improper in certain examples because relatively more advanced hearing device functions that may increase safety and/or provide a better quality of life for user 204 may be provided without additional hardware cost. In view of this, system 100 may be configured to make one or more advanced hearing device functions such as those described therein conditionally available for use by hearing device 202 even if user 204 only paid for first operating service tier 402 and first set of hearing device functions 404.

For example, while hearing device 202 operates in accordance with first set of hearing device functions 404 associated with first operating service tier 402, system 100 may facilitate hearing device 202 operating in accordance with one or more hearing device functions included second set of hearing device functions 408 associated with second operating tier 406 but not included in first set of hearing device functions 404. To that end, system 100 (e.g., processor 104) may access operating service tier data that associates first operating service tier 402 with first set of hearing device functions 404 and second operating service tier 406 with second set of hearing device functions 408. Such operating service tier data may be accessed in any suitable manner. For example, system 100 may access operating service tier data from memory 210, 304 of hearing device 202 or computing device 302 and/or from any other suitable storage location.

While hearing device 202 operates in accordance with first set of hearing device functions 404 associated with first operating service tier 402, system 100 may detect a satisfaction of a condition associated with second operating service tier 406. The condition may correspond to any suitable condition that may be used as may serve a particular implementation to determine whether to provide hearing device 202 with access to additional or alternative hearing device functions.

For example, the condition may include hearing device 202 entering a predetermined geographic area where it may be desirable to provide user 204 with additional or alternative hearing device functions. In certain examples, the predetermined geographic area may be defined by a detailed boundary. For example, the predetermined geographic area may be defined in any suitable manner by a geofenced boundary. In certain alternative examples, the predetermined geographic area may be associated with a location coordinate from which a location of the boundary may be determined. In such examples, the condition may be satisfied if a determined location of hearing device 202 is less than a predetermined threshold distance from the location coordinate. For example, the predetermined geographic area may be detected by a sensor which may be included in system 100. In such examples, a location sensor (e.g., a GPS sensor or a cellular phone location tracker) may be configured to detect a current location of the user.

In certain examples, the predetermined geographic area may correspond to a geographic area at a fixed location. For example, the predetermined geographic area may correspond to a geographic area associated with a school, a workplace, or a hospital. In certain alternative examples, the predetermined geographic area may move and/or may be time dependent. For example, the predetermined geographic area may be an area associated with a moving vehicle (e.g., an ambulance) carrying hearing device 202 and user 204.

The predetermined geographic area may be defined in any suitable manner by any suitable entity. In certain examples, a hearing care provider or an HCP may define the predetermined geographic area depending on the specific needs of user 204. For examples, an HCP may define the predetermined geographic area during and/or after fitting of hearing device 202 to user 204. In such examples, the HCP may ask user 204 for the addresses of his/her doctors, schools, workplaces, etc. and the HCP may enter them into fitting software and/or by way of any other suitable user interface.

In certain examples, the predetermined geographic area may be defined by user 204. In such examples, system 100 may provide any suitable user interface to facilitate user 204 defining a predetermined geographic area. In certain examples, user 204 may be allowed to define a certain number of predetermined geographic areas as part of an operating service tier. For example, operating service tier 402 may allow user to define up to two different geographic areas where additional hearing device functions that are not included as part of operating service tier 402 may be conditionally made available for use by hearing device 202.

In certain examples, the condition may include system 100 detecting that hearing device 202 has entered a specific type of building where it may be desirable to provide user 204 with additional hearing device functions. For example, the specific type of building may include a school, a hospital, a courtroom, a workplace, a fitness studio, a government office, or any other suitable type of building. In such examples, the satisfaction of the condition may include system 100 determining in any suitable manner that hearing device 202 has entered the building.

In certain examples, the condition may include system 100 detecting a specific time or time period during a day/night and/or on specific days of the week that hearing device 202 is being used. For example, it may be desirable to provide user 204 with additional hearing device functions during the hours of the day that user 204 is at school. In such examples, the satisfaction of the condition may include system 100 determining in any suitable manner that hearing device 202 is being used between 8:00 AM and 6:00 PM on weekdays while user 204 is at school. For example, the time or time period may be detected by a clock, which may be included in system 100, and/or by accessing the time or time period from a (public) server.

In certain examples, the condition may include system 100 detecting a predetermined sound in an environment surrounding user 204 of hearing device 202. In certain examples, such a predetermined sound may be indicative of an emergency situation where it may be desirable to make additional hearing device functions available for use by hearing device 202. For example, system 100 may leverage a microphone of hearing device 202 to detect a fire alarm, an ambulance sound, or any other suitable sound in an environment surrounding user 204 as a trigger to make additional hearing device functions available for use by hearing device 202.

In certain examples, the condition may include system 100 making a determination that user 204 or some other entity has made a payment to make another set of hearing device functions (e.g., second set of hearing device functions 408) available for use by hearing device 202. For example, user 204 may make a one-time payment (e.g., to a hearing aid provider or an HCP) to make second set of hearing device functions 408 available for use by hearing device 202 for a predetermined period of time. Alternatively, user 204 may make a payment to upgrade hearing device 202 from operating in accordance with first operating service tier 402 to operating in accordance with, for example, third operating service tier 410. Such examples may provide an environmental benefit because, instead of having to purchase a new hearing device and discard hearing device 202, user 204 may continue to use hearing device 202 after upgrading hearing device 202 to a different operating service tier. In addition, such examples may also increase the user friendliness of upgrading hearing device 202 because it is not necessary to download additional software packages and/or firmware or to visit a hearing device provider to upgrade an operating service tier of hearing device 202.

In certain examples, the condition may be associated with a payment made by a third party. For example, an entity such as a business or an employer may pay to make additional hearing device functions available to users of hearing devices while the users are located at the business or in a workplace. For example, a theater may pay to provide users of hearing devices with additional hearing device functions while at the theater to provide their customers with a better hearing experience and/or hearing support.

In certain examples, the condition may include system 100 detecting a particular type of weather in an environment surrounding user 204. The type of weather may be indicative of a condition where it may be desirable to provide additional hearing device functions for use by hearing device 202 for safety purposes. For example, system 100 may detect in any suitable manner that user 204 is in a hurricane, tornado, lightning storm, etc. where additional hearing device functions may be helpful to facilitate user 204 seeking safety. For example, the type of weather may be detected by a sensor which may be included in system 100. In such examples, a temperature sensor and/or a barometric pressure sensor which may be implemented in a hearing device and/or a computing device configured to be worn or carried by user 204. The type of weather may also be detected by system 100 by accessing a (public) weather or news server. The type of weather may also be detected remotely by a service provider, e.g., by setting a bad weather condition bit on a server which may be accessed by system 100, or by sending an according message to system 100, e.g., to a mobile phone and/or an app and/or a hearing aid in which system 100 is implemented.

In certain examples, the condition may include system 100 detecting a speed of user 204 of hearing device 202. For example, it may be desirable to make additional or alternative hearing device functions available for use by hearing device 202 while user 204 travels in a vehicle. In such examples, system 100 may use a threshold speed (e.g., 100 km/hr) as a trigger for making additional or alternative hearing device functions available for use by hearing device 202. For example, the speed of user 204 may be detected by a sensor which may be included in system 100. In such examples, a motion sensor such as an accelerometer may be implemented in a hearing device and/or a computing device configured to be worn or carried by the user.

In certain examples, the condition may include system 100 detecting whether user 204 has a predetermined health condition. For example, it may be desirable to make additional or alternative hearing device functions available for use by hearing device 202 in a situation in which user 204 is in a critical health state, e.g., a heart attack or an epileptic seizure. For example, the health condition of user 204 may be detected by a sensor which may be included in system 100. In such examples, a physiological sensor such as a photoplethysmography (PPG) sensor and/or an ECG sensor may be implemented in a hearing device and/or a computing device configured to be worn or carried by user 204.

In certain examples, the condition may include system 100 detecting whether the user is performing a particular type of activity. For example, it may be desirable to make additional or alternative hearing device functions available for use by hearing device 202 in a situation in which user 204 is performing physical exercises or a physically demanding work. For example, the type of activity of user 204 may be detected by a sensor which may be included in system 100. In such examples, a motion sensor and/or a physiological sensor may be implemented in a hearing device and/or a computing device configured to be worn or carried by user 204.

In certain examples, the condition may include system 100 detecting whether user 204 is tumbling or falling. For example, it may be desirable to make additional or alternative hearing device functions available for use by hearing device 202 in such a situation to facilitate user 204 reorienting himself/herself or to seek assistance. For example, the detecting whether user 204 is tumbling or falling may be performed by a sensor which may be included in system 100. In such examples, a motion sensor may be implemented in a hearing device and/or a computing device configured to be worn or carried by user 204.

In certain examples, the condition may include system 100 detecting whether user 204 is located at a particular altitude. For example, it may be desirable to make additional or alternative hearing device functions available for use by hearing device 202 in a situation in which user 204 is above a threshold altitude (e.g., when taking a flight or during a mountain hike). For example, the altitude of user 204 may be detected by a sensor which may be included in system 100. In such examples, a barometric pressure sensor may be implemented in a hearing device and/or a computing device configured to be worn or carried by user 204.

System 100 may detect the satisfaction of the condition in any suitable manner. In certain examples, system 100 comprises a sensor, wherein the detecting of the satisfaction of the condition includes evaluating the sensor data relative to the condition. For example, the sensor may be included in the hearing device and/or a computing device configured to be worn or carried by the user. For instance, the sensor may comprise a microphone configured to detect sound in an environment surrounding a user of the hearing device; and/or a motion sensor configured to detect a movement of the user; and/or a location sensor configured to detect a current location of the user; and/or a temperature sensor configured to detect a temperature of the environment; and/or a barometric pressure sensor configured to detect a barometric pressure of the environment; and/or a physiological sensor configured to detect a physiological property of the user; and/or a clock configured to detect a current time or time period.

For example, in implementations where the condition is associated with hearing device 202 entering a predetermined geographic area, system 100 may track a geographic location of hearing device 202 based on Global Positioning System ("GPS") information. Additionally or alternatively, the location of hearing device 202 may be tracked based on wireless local area network ("WLAN") information and/or Bluetooth signals. In certain examples, a special beacon device may be located at geographic location and may transmit a wireless signal used to detect the location of hearing device 202. In certain examples, radio frequency identifier ("RFID") tags may be located at a geographic location and may be used by system 100 in any suitable manner to determine a location of hearing device 202. For example, a doctor at a hospital may wear a special RFID tag that may be used in any suitable manner by system 100 to determine whether hearing device 202 is within a hospital.

Based on the detecting of the satisfaction of the condition, system 100 may direct hearing device 202 to switch from operating in accordance with a first set of hearing device functions to operating in accordance with a second set of hearing device functions. In certain examples, the switching may include system 100 directing hearing device 202 to operate in accordance with all of the hearing device functions associated with the second set of hearing device functions. Alternatively, the switching may include system 100 directing hearing device 202 to operate in accordance with a subset of the hearing device functions associated with the second set of hearing device functions. For example, system 100 may direct hearing device 202 to operate in accordance with one or more hearing device functions that are included in the second set of hearing device functions but that are not included in the first set of hearing device functions.

System 100 may direct hearing device 202 to operate in accordance with the second set of hearing device functions in any suitable manner. For example, the operation of hearing device 202 in accordance with the second set of hearing device functions may be time dependent. To illustrate an example, user 204 may be provided with an opportunity to test one or more advanced hearing device functions included in the second set of hearing device functions for a testing period, which may be freely available to user 204 for a predetermined number of times (e.g., once). After the testing period, hearing device 202 may automatically revert to operating in accordance with a base set of hearing device functions. As another example, user 204 may want to use one or more advanced hearing device functions included in the second set of hearing device functions for a certain period of time at a specific location. For example, user 204 may want to have a relatively better hearing experience while attending a concert. In such an example, system 100 may detect a payment provided by user 204 (e.g., to a hearing device provider) and may facilitate a limited upgrade to the second set of hearing device functions for the duration of the concert.

Figure 5:
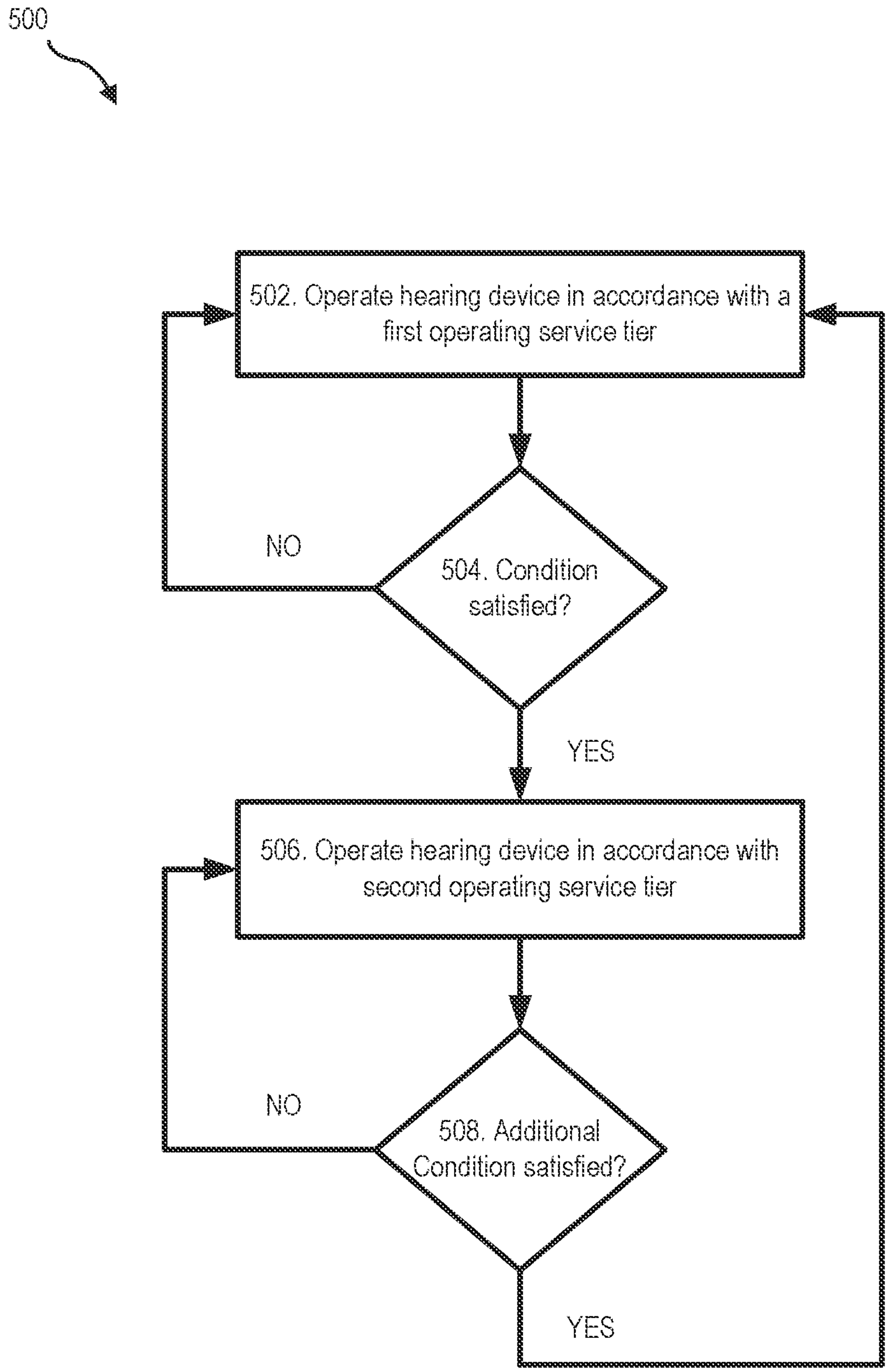
FIG. 5 illustrates an exemplary flow diagram that may be implemented according to principles described herein.

FIG. 5 illustrates an exemplary flow diagram 500 depicting various operations that may be performed by system 100 to facilitate operating hearing device 202 in accordance with a plurality of operating service tiers. At operation 502, system 100 may direct hearing device 202 to operate in accordance with a first operating service tier (e.g., operating service tier 402). At operation 504, system 100 may determine whether a condition has been satisfied. The condition may correspond to any suitable type of condition such as those described herein. If the answer at operation 504 is "NO," system 100 may continue to direct hearing device 202 to operate in accordance with a first operating service tier. If the answer at operation 504 is "YES," system 100 may direct hearing device 202 to operate in accordance with a second operating service tier (e.g., third operating service tier 410) instead of the first operating service tier at operation 506. In so doing, system 100 may make one or more hearing device functions available for use by hearing device 202 that are not available as part of the hearing device functions associated with the first operating service tier. For example, the first operating service tier may not include an active noise cancellation function. However, the active noise cancellation function may be made available for use by hearing device 202 based on the condition determined at operation 504.

At operation 508, system 100 may determine whether an additional condition is satisfied. The additional condition may correspond to any suitable condition associated with the second operating service tier. For example, in certain implementations, the detecting of the satisfaction of the additional condition may include system 100 determining that a predetermined period of time has expired. Additionally or alternatively, the detecting of the satisfaction of the additional condition may include system 100 determining that hearing device 202 has exited a predetermined geographic area. In such examples, the additional condition may be considered as being satisfied as soon as hearing device 202 has exited the predetermined geographic area. Alternatively, system 100 may determine that the additional condition is satisfied after a predetermined period of time (e.g., 1 hour) has expired after hearing device 202 exits the predetermined geographic area. In so doing, it may be possible to avoid frequent switching of operating service tiers.

If the answer at operation 508 is "NO," system 100 may direct hearing device 202 to continue to operate in accordance with the second operating service tier. If the answer at operation 508 is "YES," the flow returns to operation 502 and system 100 may direct hearing device 202 to operate in accordance with the first operating service tier instead of the second operating service tier.

Figure 6:
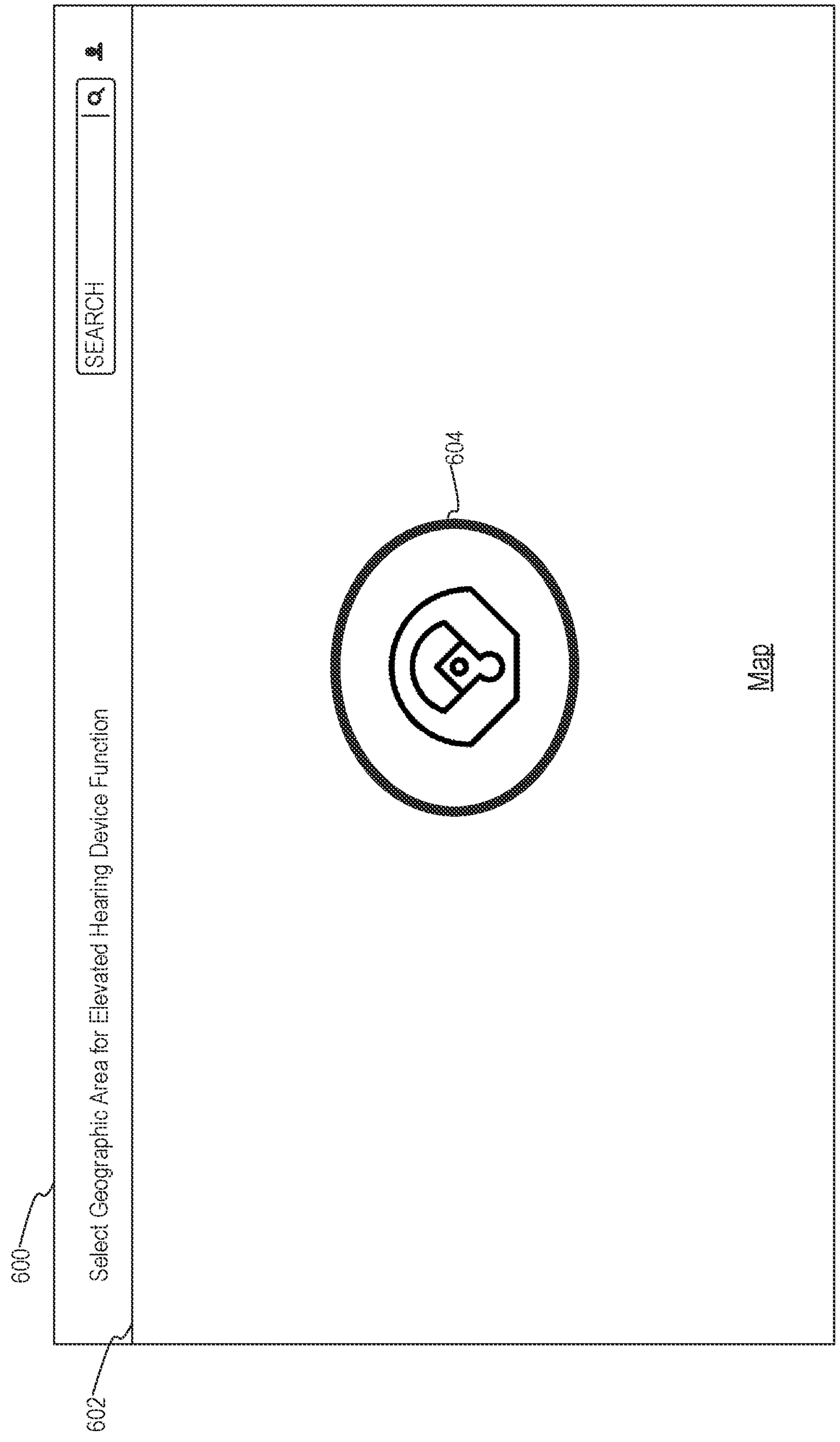
FIG. 6 illustrates an exemplary graphical user interface that may be provided for display according to principles described herein.

FIG. 6 illustrates an exemplary graphical user interface view 600 that may be provided for display to facilitate a user (e.g., user 204 and/or an HCP) designating a predetermined geographic area where additional hearing device functions may be made available for use by hearing device 202. Graphical user interface view 600 may be provided for display by way of any suitable computing device as may serve a particular implementation. For example, graphical user interface view 600 may be provided for display to user 204 by way of a display screen of computing device 302. Additionally or alternatively, graphical user interface view 600 may be provided for display by way of a display screen of a fitting system to an HCP during fitting of hearing device 202 to user 204.

As shown in FIG. 6, graphical user interface view 600 includes a map 602 of a geographic area that may be selected by a user. A boundary 604 may be defined by the user in any suitable manner to designate an area where additional or alternative hearing device functions may be made available for use by hearing device 202. For example, user 204 may provide a touch input by way of a touch screen displaying graphical user interface view 600 to designate a location and/or size of boundary 604. In the example shown in FIG. 6, user 204 may play softball and may want to have additional or alternative hearing device functions available for use by hearing device 202 while user is at the softball fields located in the area depicted in map 602. Accordingly, user 204 may designate a location and/or size of boundary 604 as shown in FIG. 6 to ensure that hearing device 202 is configured to provide user 204 with the best possible hearing support/hearing device functions while user 204 is playing softball.

Figure 7:
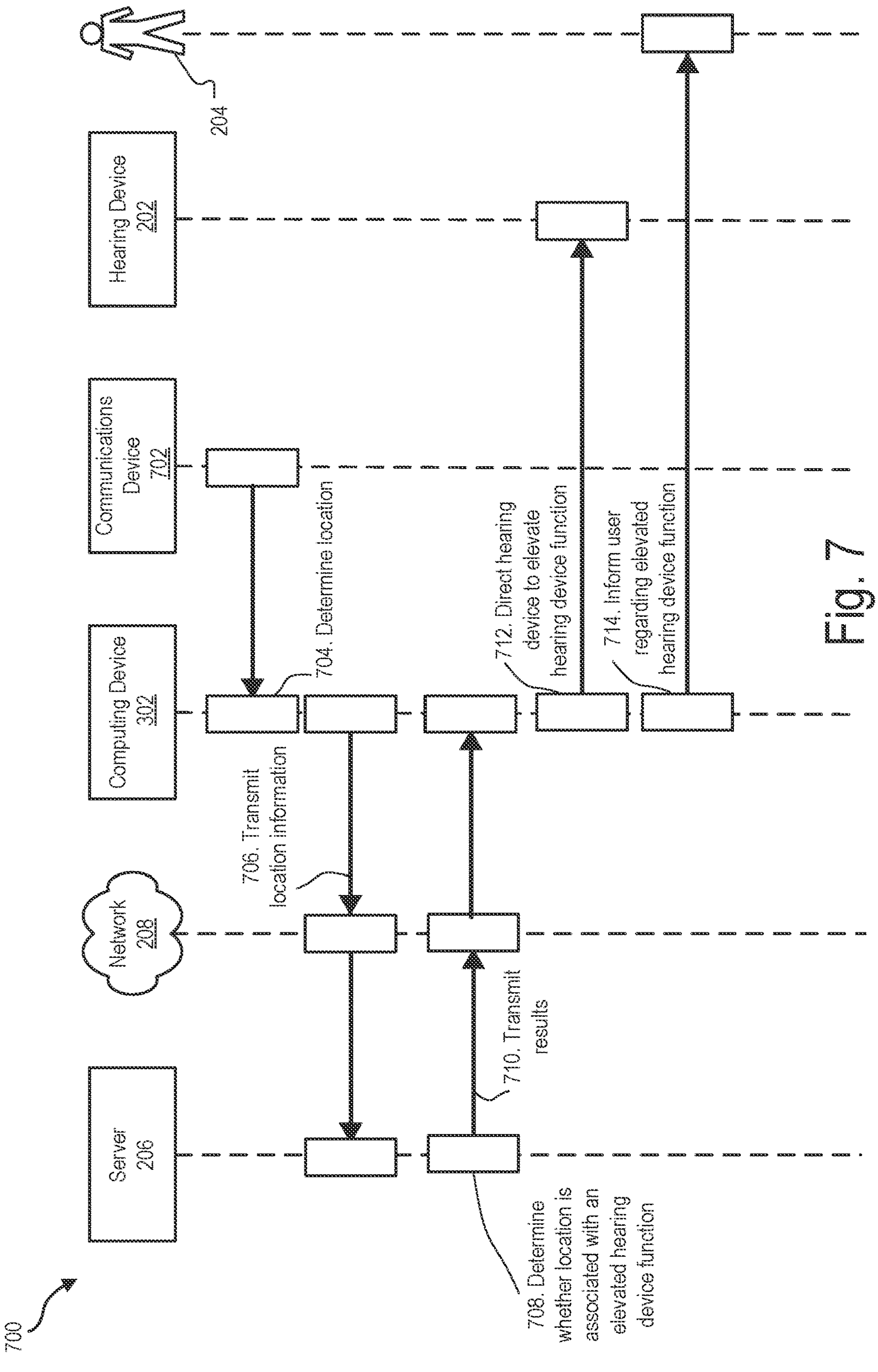
FIG. 7 illustrates another exemplary flow diagram that may be implemented according to principles described herein.

FIG. 7 illustrates another exemplary flow diagram 700 that depicts an exemplary configuration of system 100 and various operations that may be performed by system 100 in conjunction with controlling hearing device 202 in accordance with a plurality of operating service tiers. As shown in FIG. 7, the exemplary configuration may include server 206 and a communications device 702 that may be communicatively coupled to one another in addition to computing device 302 and hearing device 202. Server 206 may correspond to any suitable network computing device or combination of computing devices that may facilitate performing any of the operations described herein. Communications device 702 may correspond to any suitable type of device that may facilitate determining a geographic location of hearing device 202. For example, communications device 702 may correspond to a GPS satellite that is configured to provide GPS signals that may be used by system 100 to determine a geographic location of hearing device 202.

At operation 704, computing device 302 may determine a location of hearing device 202 in any suitable manner based on information received from communications device 702. Computing device 302 may correspond to any suitable type of computing device such as those described herein. For example, computing device 302 may correspond to a smartphone that is communicatively coupled to hearing device 202 and server 206 by way of network 208.

At operation 706, computing device 302 may transmit the location information to server 206 by way of network 208 in any suitable manner.

At operation 708, server 206 may determine whether the location of hearing device 202 is associated with one or more elevated hearing device functions. This may be accomplished in any suitable manner. For example, server 206 may compare the location of hearing device 202 to a database of predetermined geographic areas/locations where hearing device 202 is authorized to use additional or alternative hearing device functions. If the location of hearing device 202 matches or is within a predetermined threshold distance from a predetermined geographic area/location in the database, server 206 may determine that hearing device 202 may use one or more additional or alternative hearing device functions. Based on the determination at operation 708, server 206 may transmit the results to computing device 302 at operation 710.

At operation 712, computing device 302 may direct hearing device 202 to elevate hearing device function. For example, computing device 302 may direct hearing device 202 to switch from using hearing device functions included in a first operating service tier to using one or more advanced hearing device functions that are included in a second operating service tier but are not included in the first operating service tier.

In certain examples, computing device 302 may provide a notification at operation 714 that informs user 204 that the additional or alternative hearing device functions are available for use by hearing device 202. Such a notification may be provided in any suitable manner. For example, computing device 302 may provide a text notification by way of a display screen of computing device 302 that indicates that one or more hearing device functions associated with a relatively higher operating service tier have been made available for use by hearing device 202. Such a notification may include any suitable information associated with the one or more hearing device functions. For example, the information may include the name of the one or more hearing device functions, may identify why the one or more hearing device functions are now available for use, and/or may indicate when the one or more hearing device functions will no longer be available. Additionally or alternatively, computing device 302 may provide an audio notification to user 204 by way of a speaker of computing device 302 and/or a speaker of hearing device 202.

In certain examples, the making of one or more hearing device functions associated with a second operating service tier available for use by hearing device 202 does not necessarily mean that those one or more hearing device functions have been activated by hearing device 202. Rather, activation of the one or more hearing device functions may be contingent upon an additional condition being satisfied. For example, a hearing device function that may become available as part of the second operating service tier may be an "In-Car" program configured to be used while hearing device 202 is in a vehicle and within a predetermined proximity of a facility such as a hospital. However, the "In-Car" program may only be activated based on user 204 manually selecting the "In-Car" program or when a situational classifier detects such a situation and hearing device 202 automatically switches to the "In-Car" program. Otherwise, an additional program such as a "Quiet-Situation" program may be active while the "In-Car" program may only be available.

Although the preceding disclosure describes various conditions configured to trigger making additional or alternative hearing device functions available for use by hearing device 202, it is understood that certain conditions may trigger making less hearing device functions being available for use by hearing device 202. For example, in certain implementations, a determination that hearing device 202 has entered a predetermined geographic area may trigger a switch from an operating service tier with relatively more or more advanced hearing device functions to an operating service tier with relatively fewer or less advanced hearing device functions. In certain examples, certain conditions such as those described herein may trigger completely switching-off hearing device 202.

Figure 8:
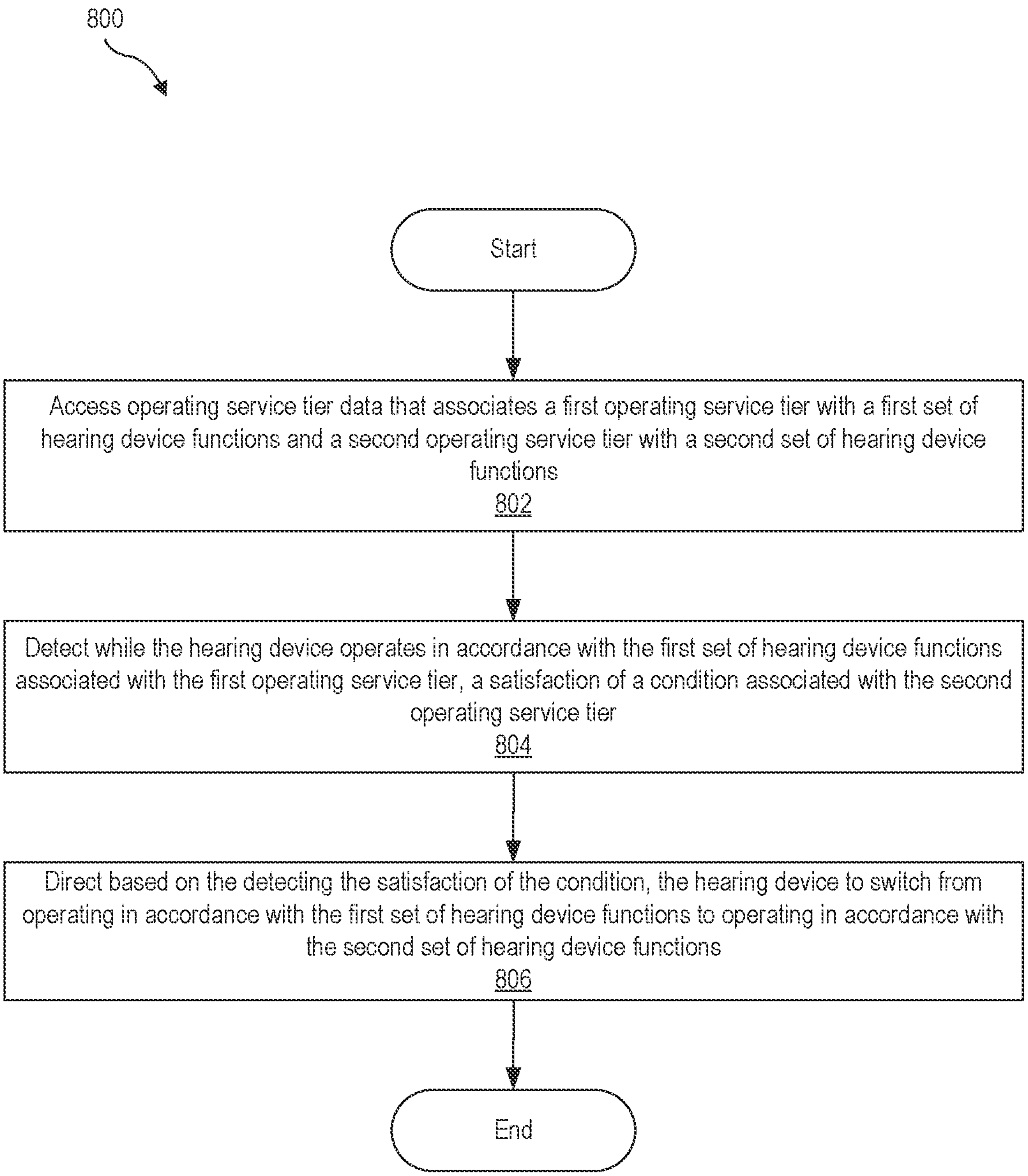
FIG. 8 illustrates an exemplary method according to principles described herein.

FIG. 8 illustrates an exemplary method 800 for operating a hearing device in accordance with a plurality of operating service tiers according to principles described herein. While FIG. 8 illustrates exemplary operations according to one embodiment, other embodiments may omit, add to, reorder, and/or modify any of the operations shown in FIG. 8. One or more of the operations shown in FIG. 8 may be performed by a hearing device such as hearing device 202, an external computing device (e.g., computing device 302) communicatively coupled to hearing device 202, any components included therein, and/or any combination or implementation thereof.

At operation 802, a hearing device management system such as hearing device management system 100 may access operating service tier data that associates a first operating service tier with a first set of hearing device functions and a second operating service tier with a second set of hearing device functions. The second set of hearing device functions may include at least one hearing device function that is different than the hearing device functions included in the first set of hearing device functions. Operation 802 may be performed in any of the ways described herein.

At operation 804, the hearing device management system may detect, while the hearing device operates in accordance with the first set of hearing device functions associated with the first operating service tier, a satisfaction of a condition associated with the second operating service tier. Operation 804 may be performed in any of the ways described herein.

At operation 806, the hearing device management system may direct, based on the detecting the satisfaction of the condition, the hearing device to switch from operating in accordance with the first set of hearing device functions to operating in accordance with the second set of hearing device functions. Operation 806 may be performed in any of the ways described herein.

In some examples, a non-transitory computer-readable medium storing computer-readable instructions may be provided in accordance with the principles described herein. The instructions, when executed by a processor of a computing device, may direct the processor and/or computing device to perform one or more operations, including one or more of the operations described herein. Such instructions may be stored and/or transmitted using any of a variety of known computer-readable media.

A non-transitory computer-readable medium as referred to herein may include any non-transitory storage medium that participates in providing data (e.g., instructions) that may be read and/or executed by a computing device (e.g., by a processor of a computing device). For example, a non-transitory computer-readable medium may include, but is not limited to, any combination of non-volatile storage media and/or volatile storage media. Exemplary non-volatile storage media include, but are not limited to, read-only memory, flash memory, a solid-state drive, a magnetic storage device (e.g., a hard disk, a floppy disk, magnetic tape, etc.), ferroelectric random-access memory ("RAM"), and an optical disc (e.g., a compact disc, a digital video disc, a Blu-ray disc, etc.). Exemplary volatile storage media include, but are not limited to, RAM (e.g., dynamic RAM).

Figure 9:
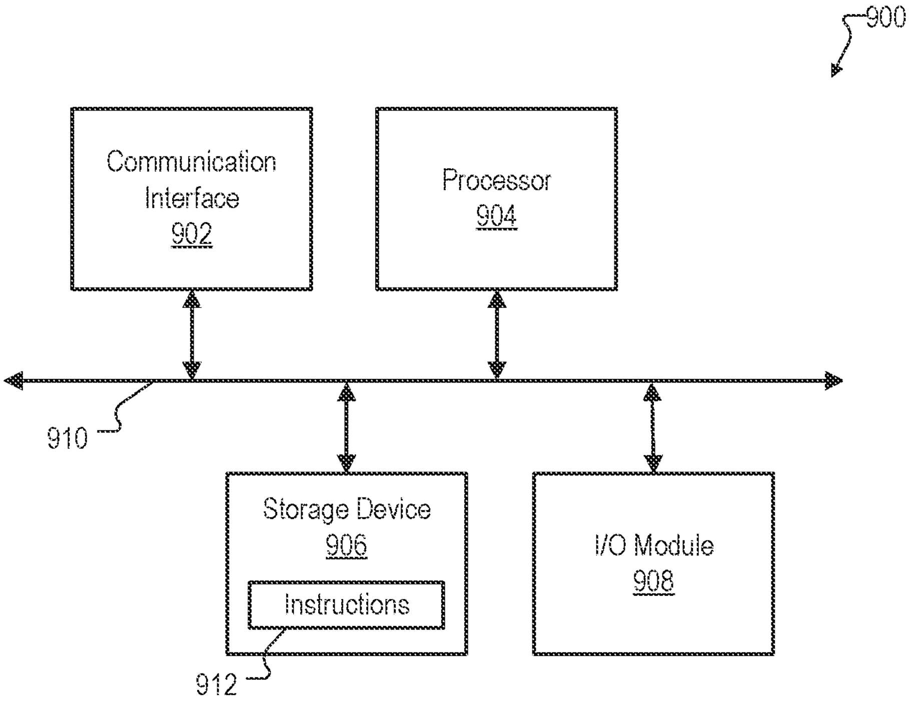
FIG. 9 illustrates an exemplary computing device according to principles described herein.

FIG. 9 illustrates an exemplary computing device 900 that may be specifically configured to perform one or more of the processes described herein. As shown in FIG. 9, computing device 900 may include a communication interface 902, a processor 904, a storage device 906, and an input/output ("I/O") module 908 communicatively connected one to another via a communication infrastructure 910. While an exemplary computing device 900 is shown in FIG. 9, the components illustrated in FIG. 9 are not intended to be limiting. Additional or alternative components may be used in other embodiments. Components of computing device 900 shown in FIG. 9 will now be described in additional detail.

Communication interface 902 may be configured to communicate with one or more computing devices. Examples of communication interface 902 include, without limitation, a wired network interface (such as a network interface card), a wireless network interface (such as a wireless network interface card), a modem, an audio/video connection, and any other suitable interface.

Processor 904 generally represents any type or form of processing unit capable of processing data and/or interpreting, executing, and/or directing execution of one or more of the instructions, processes, and/or operations described herein. Processor 904 may perform operations by executing computer-executable instructions 912 (e.g., an application, software, code, and/or other executable data instance) stored in storage device 906.

Storage device 906 may include one or more data storage media, devices, or configurations and may employ any type, form, and combination of data storage media and/or device. For example, storage device 906 may include, but is not limited to, any combination of the non-volatile media and/or volatile media described herein. Electronic data, including data described herein, may be temporarily and/or permanently stored in storage device 906. For example, data representative of computer-executable instructions 912 configured to direct processor 904 to perform any of the operations described herein may be stored within storage device 906. In some examples, data may be arranged in one or more databases residing within storage device 906.

I/O module 908 may include one or more I/O modules configured to receive user input and provide user output. I/O module 908 may include any hardware, firmware, software, or combination thereof supportive of input and output capabilities. For example, I/O module 908 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 908 is configured to provide graphical data to a display for presentation to a user. The graphical data may be representative of one or more graphical user interfaces and/or any other graphical content as may serve a particular implementation.

In some examples, any of the systems, hearing devices, computing devices, and/or other components described herein may be implemented by computing device 900. For example, memory 102, memory 210, and/or memory 304 may be implemented by storage device 906, and processor 104, processor 212, and/or processor 306 may be implemented by processor 904.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A hearing system comprising:

a hearing device configured to be worn at an ear of a user;

a memory storing instructions; and one or more processors communicatively coupled to the memory and configured to execute the instructions to perform a process comprising:

accessing operating service tier data that associates a first operating service tier with a first set of hearing device functions and a second operating service tier with a second set of hearing device functions, the second set of hearing device functions including at least one hearing device function that is different than the hearing device functions included in the first set of hearing device functions;

detecting, while the hearing device operates in accordance with the first set of hearing device functions associated with the first operating service tier, a satisfaction of a condition associated with the second operating service tier;

directing, based on the detecting the satisfaction of the condition, the hearing device to switch from operating in accordance with the first set of hearing device functions to operating in accordance with the second set of hearing device functions;

detecting, subsequent to the directing of the hearing device to operate in accordance with the second set of hearing device functions, a satisfaction of an additional condition associated with the second operating service tier; and directing, based on the detecting the satisfaction of the additional condition, the hearing device to switch from operating in accordance with the second set of hearing device functions to operating in accordance with the first set of hearing device functions.

2. The hearing system of claim 1, wherein the detecting of the satisfaction of the condition includes:

tracking a geographic location of the hearing device; and determining, based on the geographic location, that the hearing device has entered a predetermined geographic area.

3. The hearing system of claim 2, wherein the predetermined geographic area is defined by a user of the hearing device.

4. The hearing system of claim 1, wherein the detecting of the satisfaction of the condition includes at least one of detecting a predetermined sound in an environment surrounding a user of the hearing device;

detecting a predetermined geographic area which the user has entered;

detecting a predetermined speed at which the user moves;

detecting a predetermined type of weather in the environment;

detecting a predetermined health condition of the user;

detecting a predetermined altitude of the user;

detecting a predetermined type of physical activity of the user; or detecting whether the user is tumbling or falling.

5. The hearing system of claim 1 further comprising a sensor included in the hearing device, wherein the detecting of the satisfaction of the condition includes evaluating sensor data from the sensor relative to the condition.

6. The hearing system of claim 5, wherein the sensor comprises at least one of a microphone configured to detect sound in an environment surrounding a user of the hearing device;

a motion sensor configured to detect a movement of the user;

a location sensor configured to detect a current location of the user;

a clock configured to detect a current time or time period;

a temperature sensor configured to detect a temperature of the environment;

a barometric pressure sensor configured to detect a barometric pressure of the environment; and a physiological sensor configured to detect a physiological property of the user.

7. The hearing system of claim 1, wherein the detecting of the satisfaction of the additional condition includes determining that a predetermined period of time has expired.

8. The hearing system of claim 1, wherein the detecting of the satisfaction of the additional condition includes determining that the hearing device has exited a predetermined geographic area.

9. The hearing system of claim 1, wherein the second operating service tier is relatively more expensive than the first operating service tier.

10. The hearing system of claim 1, wherein the first set of hearing device functions associated with the first operating service tier and the second set of hearing device functions associated with the second operating service tier are each implemented by the same firmware installed in the hearing device.

11. The hearing system of claim 1, wherein:

the first set of hearing device functions associated with the first operating service tier is implemented by a first firmware installed in the hearing device;

the second set of hearing device functions associated with the second operating service tier is implemented by a second firmware installed in the hearing device; and the directing of the hearing device to switch from operating in accordance with the first set of hearing device functions to operating in accordance with the second set of hearing device functions includes activating the second firmware installed in the hearing device.

12. The hearing system of claim 1, wherein the memory and the one or more processors are implemented by the hearing device, by a computing device that is communicatively coupled to the hearing device by way of a wireless communication channel, or by a combination of the hearing device and the computing device.

13. A non-transitory computer-readable medium storing instructions that, when executed, direct a processor of a computing device to perform a process comprising:

accessing operating service tier data that associates a first operating service tier with a first set of hearing device functions and a second operating service tier with a second set of hearing device functions, the second set of hearing device functions including at least one hearing device function that is different than the hearing device functions included in the first set of hearing device functions;

detecting, while a hearing device operates in accordance with the first set of hearing device functions associated with the first operating service tier, a satisfaction of a condition associated with the second operating service tier;

directing, based on the detecting the satisfaction of the condition, the hearing device to switch from operating in accordance with the first set of hearing device functions to operating in accordance with the second set of hearing device functions;

detecting, subsequent to the directing of the hearing device to operate in accordance with the second set of hearing device functions, a satisfaction of an additional condition associated with the second operating service tier; and directing, based on the detecting the satisfaction of the additional condition, the hearing device to switch from operating in accordance with the second set of hearing device functions to operating in accordance with the first set of hearing device functions.

14. The non-transitory computer-readable medium of claim 13, wherein the detecting of the satisfaction of the condition includes:

tracking a geographic location of the hearing device; and determining, based on the geographic location, that the hearing device has entered a predetermined geographic area.

15. The non-transitory computer-readable medium of claim 13, wherein the detecting of the satisfaction of the additional condition includes determining that the hearing device has exited a predetermined geographic area.

16. A method comprising:

accessing, by a hearing device management system, operating service tier data that associates a first operating service tier with a first set of hearing device functions and a second operating service tier with a second set of hearing device functions, the second set of hearing device functions including at least one hearing device function that is different than the hearing device functions included in the first set of hearing device functions;

detecting, by the hearing device management system and while a hearing device operates in accordance with the first set of hearing device functions associated with the first operating service tier, a satisfaction of a condition associated with the second operating service tier;

directing, by the hearing device management system and based on the detecting the satisfaction of the condition, the hearing device to switch from operating in accordance with the first set of hearing device functions to operating in accordance with the second set of hearing device functions;

detecting, by the hearing device management system and subsequent to the directing of the hearing device to operate in accordance with the second set of hearing device functions, a satisfaction of an additional condition associated with the second operating service tier; and directing, by the hearing device management system and based on the detecting the satisfaction of the additional condition, the hearing device to switch from operating in accordance with the second set of hearing device functions to operating in accordance with the first set of hearing device functions.

17. The method of claim 16, wherein the detecting of the satisfaction of the condition includes:

tracking a geographic location of the hearing device; and determining, based on the geographic location, that the hearing device has entered a predetermined geographic area.

* * * * *